US012617478B2

(12) United States Patent
Taylor et al.

(10) Patent No.: US 12,617,478 B2
(45) Date of Patent: May 5, 2026

(54) TAILGATE ASSEMBLY

(71) Applicant: BROSE FAHRZEUGTEILE SE & CO. KOMMANDITGESELLSCHAFT, BAMBERG, Bamberg (DE)

(72) Inventors: Kim Taylor, Farmington Hills, MI (US); Mark Farrugia, Clarkston, MI (US); Ehren Mroczek, Mishawaka, IN (US)

(73) Assignee: BROSE FAHRZEUGTEILE SE & CO. KOMMANDITGESELLSCHAFT, BAMBERG (DE)

( * ) Notice: Subject to any disclaimer, the term of this patent is extended or adjusted under 35 U.S.C. 154(b) by 375 days.

(21) Appl. No.: 18/226,498

(22) Filed: Jul. 26, 2023

(65) Prior Publication Data

US 2025/0033710 A1     Jan. 30, 2025

(51) Int. Cl.
| | |
|---|---|
| *B62D 33/037* | (2006.01) |
| *B60R 3/02* | (2006.01) |
| *B62D 33/027* | (2006.01) |
| *E05B 15/00* | (2006.01) |
| *E05B 79/02* | (2014.01) |
| *E05B 81/18* | (2014.01) |
| *E05F 15/00* | (2015.01) |

(52) U.S. Cl.
CPC .............. B62D 33/037 (2013.01); B60R 3/02 (2013.01); B62D 33/0273 (2013.01);
(Continued)

(58) Field of Classification Search
CPC .. B62D 33/03; B62D 33/037; B62D 33/0273; B60R 3/02; E05B 15/004; E05B 81/18; E05B 79/02; E05B 81/06; E05B 85/04;

E05B 85/20; E05F 15/00; E05F 15/627; E05F 15/611; E05Y 2201/702; E05Y 2600/46; E05Y 2600/626; E05Y 2800/10; E05Y 2900/544; E05Y 2900/516; E05Y 2900/532; E05Y 2900/546; B60J 5/108
(Continued)

(56) References Cited

U.S. PATENT DOCUMENTS

| | | | |
|---|---|---|---|
| 324,196 A | * | 8/1885 | Walling .................... B60N 2/14 296/62 |
| 6,905,157 B2 | * | 6/2005 | Kang ................. B62D 33/0273 296/57.1 |

(Continued)

FOREIGN PATENT DOCUMENTS

CN          119218316     * 12/2024

*Primary Examiner* — Jonathan Malikasim
(74) *Attorney, Agent, or Firm* — Dickinson Wright PLLC

(57) ABSTRACT

A tailgate assembly including a first gate and a second gate. The first gate configured to rotate with respect to a vehicle body and the second gate configured to rotate with respect to the first gate. The second gate includes an outer panel, an injection molded carrier plate, and a drive mechanism. The injection molded carrier plate is configured to be fixed the outer panel to form a cavity. And the injection molded carrier plate is configured to carry a number of functional components. The drive mechanism is fixed to the carrier plate and operably connected to at least one functional component of the number of functional components. Drive mechanism is configured to actuate and move the at least one functional component with respect to the second gate between the number of positions.

20 Claims, 9 Drawing Sheets

(52) U.S. Cl.
CPC ............ *E05B 15/004* (2013.01); *E05B 81/18* (2013.01); *E05F 15/00* (2013.01); *E05B 79/02* (2013.01); *E05Y 2201/702* (2013.01); *E05Y 2600/46* (2013.01); *E05Y 2600/626* (2013.01); *E05Y 2800/10* (2013.01); *E05Y 2900/544* (2013.01)

(58) Field of Classification Search
USPC .................................................. 296/57.1, 62
See application file for complete search history.

(56) References Cited

U.S. PATENT DOCUMENTS

| | | | | |
|---|---|---|---|---|
| 7,287,798 | B2 * | 10/2007 | King | B62D 35/007 |
| | | | | 296/180.1 |
| 7,695,043 | B2 * | 4/2010 | Zagoroff | B62D 33/03 |
| | | | | 296/57.1 |
| 8,201,869 | B1 * | 6/2012 | Butlin, Jr. | B60R 3/02 |
| | | | | 296/57.1 |
| 8,348,325 | B2 * | 1/2013 | Hausler | B62D 33/0273 |
| | | | | 296/62 |
| 10,569,812 | B2 * | 2/2020 | Tyagi | B62D 33/037 |
| 11,577,791 | B2 * | 2/2023 | Hung | B60R 3/02 |
| 11,603,045 | B2 * | 3/2023 | Patterson | B62D 33/0273 |
| 11,608,123 | B2 * | 3/2023 | Jarjoura | B62D 33/0273 |
| 11,661,118 | B2 * | 5/2023 | Goodenough | B60R 3/02 |
| | | | | 296/50 |
| 11,873,033 | B2 * | 1/2024 | Lehti | B60R 3/02 |
| 12,018,521 | B1 * | 6/2024 | Roberson | B60Q 1/247 |
| 12,187,351 | B2 * | 1/2025 | Adams | B62D 33/0273 |
| 12,188,279 | B2 * | 1/2025 | Komaromi | E05F 15/40 |
| 12,409,783 | B2 * | 9/2025 | Ebanks | B60Q 1/30 |
| 2017/0291551 | A1 * | 10/2017 | Krajenke | B62D 33/0273 |
| 2020/0290525 | A1 * | 9/2020 | Viniegra | B60R 11/06 |
| 2022/0363321 | A1 | 11/2022 | Adams et al. | |

* cited by examiner

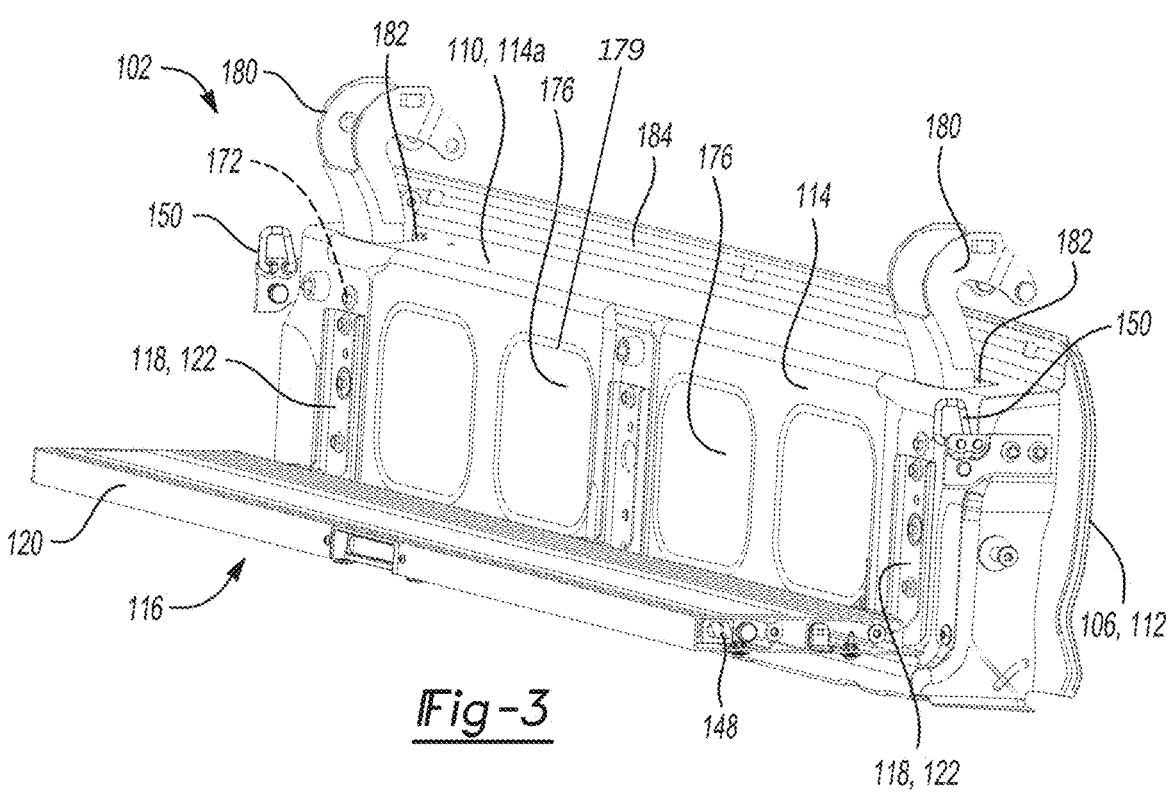
_Fig-3_
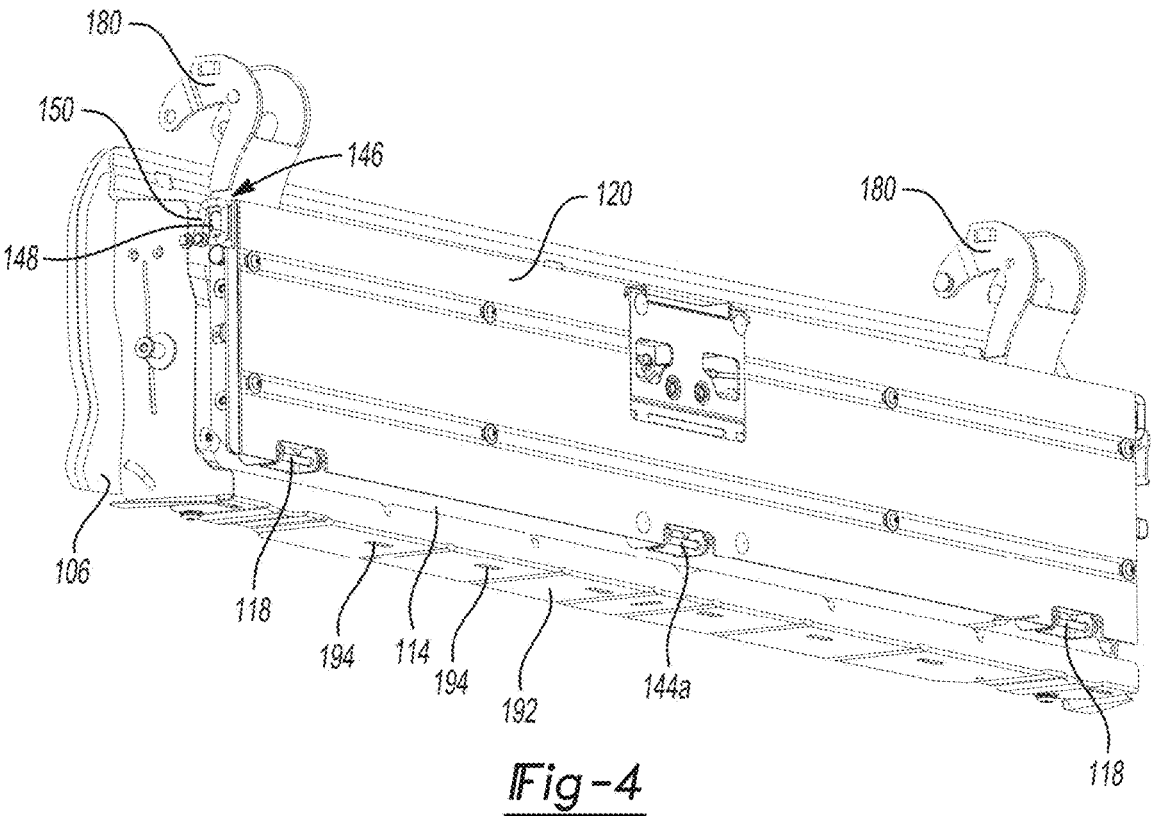
_Fig-4_

TAILGATE ASSEMBLY

TECHNICAL FIELD

The present disclosure relates to vehicle closures such as a tailgate for a truck.

BACKGROUND

Vehicles such as trucks may include a truck bed and a tailgate that may be rotated from a closed position to an open position to facilitate loading and unloading of items within the truck bed. Certain tailgates may be powered so that the tailgate may be actuated remotely or without assistance from a user. As another example, certain tailgates may include one or more deployable accessories such as a secondary gate that may be moved with respect to a main portion of the tailgate.

SUMMARY

According to one aspect of the present disclosure, a tailgate assembly is provided. The tailgate assembly may include a first gate and a second gate. The first gate may be configured to rotate with respect to a vehicle body and the second gate may be configured to rotate with respect to the first gate. The second gate may include an outer panel, an injection molded carrier plate, and a drive mechanism. The injection molded carrier plate may be configured to be fixed the outer panel to form a cavity. And the injection molded carrier plate may be configured to carry a number of functional components. The drive mechanism may be fixed to the carrier plate and operably connected to at least one functional component of the number of functional components. Drive mechanism may be configured to actuate and move the at least one functional component with respect to the second gate between the number of positions.

According to another aspect, an assembly module configured for use in a tailgate assembly is provided. The tailgate assembly may include a major gate and a minor gate. The major gate may be configured to rotate with respect to a vehicle body and the minor gate may be configured to rotate with respect to the major gate. The assembly module may include a carrier plate, a deployable member, a linear actuator, a force-transmission member, and a pivot bracket. The carrier plate may be configured to be fixed to an outer panel of a minor gate and may include a main body having a first surface and a second surface, the first surface opposing the second surface. The carrier plate may also include a number of flanges extending from the first surface. The deployable member may be operably couple to the number of flanges and configured to rotate with respect to the carrier plate about the number of flanges between a deployed position and a non-use position. Linear actuator may be fixed to the second surface of the carrier plate. The force-transmission member may include a first end and a second end, the first end may be fixed to the deployable member. Pivot bracket may be pivotally coupled to the second surface of the carrier plate and may include the first leg and a second leg, the first leg may be connected to the force transmission member and the second leg may be fixed to the linear actuator.

According to yet another embodiment, a method of assembling a minor gate for use in a tailgate assembly is provided. The tailgate assembly may be provided with a major gate and a minor gate, the major gate may be configured to rotate with respect to a vehicle body and the minor gate may be configured to rotate with respect to the major gate. The method may include forming a carrier plate that may be configured to be fixed to an outer panel of minor gate. The carrier plate may include a main body having a first side and a second side, the first side opposing the second side. The method may also include: attaching at least one minor gate hinge to a first side of the carrier plate, the at least one minor gate hinge may be configured to be rotationally fixed to the major gate; attaching at least one tailgate step assembly to the second side of the carrier plate, the tailgate step assembly may include a tailgate step hinge and a platform configured to rotate with respect to the tailgate step hinge; inserting at least one vehicle accessory into one of a number of vehicle accessory apertures; attaching at least one drive mounting bracket to the first side of the carrier plate so that at least a portion of the drive mounting bracket covers the at least one vehicle accessory;

BRIEF DESCRIPTION OF THE DRAWINGS

FIG. 3 illustrates a rear-perspective view of a portion of the exemplary tailgate assembly.

FIG. 4 illustrates another rear-perspective view of a portion of the exemplary tailgate assembly.

DETAILED DESCRIPTION

Figure 1:
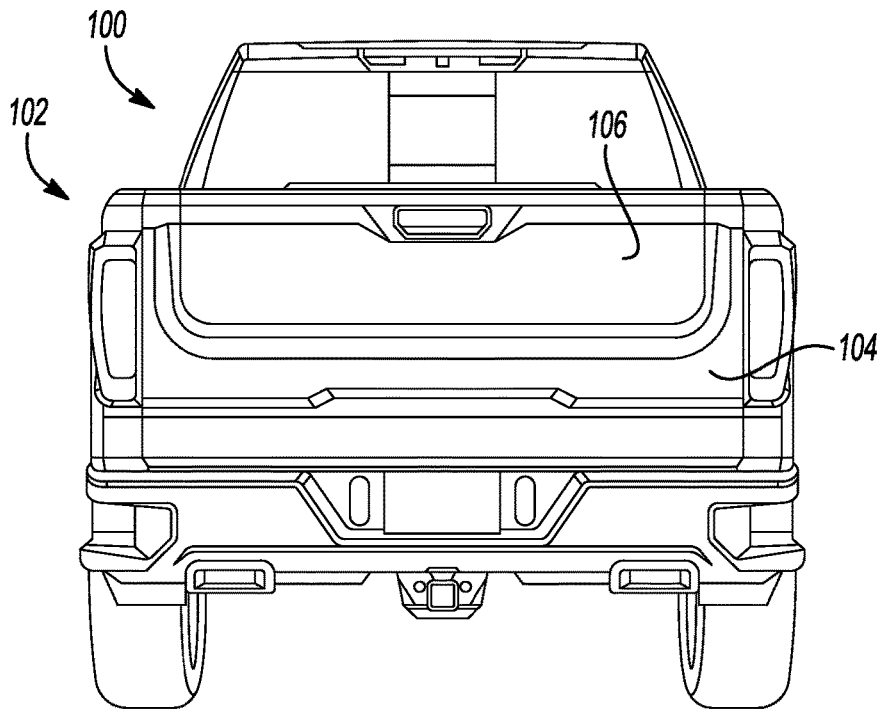
FIG. 1 illustrates a rear view of an exemplary truck provided with an exemplary tailgate assembly provided with major gate and minor gate.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within +0%, 0.1%, 0.5%, 1%, 2%, 3%, 4%, 5% or 10% of the value or relative characteristic.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Truck or SUV tailgates may include various features and accessories to make the use of the truck more convenient and enjoyable. As an example, tailgates may include a step that may be actuated between a non-use position and use position to provide easier access to the truck bed. A truck tailgate typically includes the structural tailgate body having an outer sheet metal panel and an inner sheet metal panel, a number of hardware components and functional components mounted within an internal cavity formed between the outer sheet metal panel and the inner sheet metal panel. Conventionally, an original equipment manufacturer (OEM) was required to install each functional and hardware component as well as the outer panel to the structural door panel as the assembly moved along an assembly line. This conventional process resulted in higher cycle times to assemble the tailgate. Secondly, the operation of the functional components and hardware could not be tested or verified until the installation and assembly process was completed.

Referring generally to the figures, a tailgate assembly 102 is provided. The tailgate assembly 102 may be configured for use in a vehicle, such as a truck 100 and may include a major gate 104 and a minor gate 106. For the purposes of this disclosure, the major gate 104 may be referred to as a first gate and the minor gate 106 may be referred to as a second gate. The minor gate 106 may be configured to rotate with respect to the major gate 104 which may be configured to a rotate with respect to vehicle body 108.

The minor gate 106 includes a carrier plate 110 that may be fixed to an outer panel 112 of the minor gate 106. The carrier plate 110 may include a main body 114 provided with first side 114a and second side 114b, the second side 114b may oppose the first side 114a, and one or more flanges 122 may extend from the first side 114a of the carrier plate 110. The flanges 122 may be configured to receive one or more functional components.

The minor gate 106 may include one or more functional components that may be integrated with or assembled to the carrier plate 110. In one or more embodiments, the carrier plate 110 may include a drive mechanism 124 that may be configured to move or provide access to one or more of the functional components. As an example, functional components may include a deployable member, a latch mechanism configured to latch or lock the deployable member to the minor gate 106, vehicle accessories such as audio speakers, sensors, cameras, lights, and etc. As one example, the deployable member may be a platform 120 that may be part of a tailgate step assembly 116 comprising a number of (e.g., two) tailgate step hinges 118 and a platform 120.

As will be described in greater detail below, the drive mechanism 124 may be operably connected to the deployable member (e.g., platform 120) so that actuation of the drive mechanism 124 moves the deployable member 120 with respect to the minor gate 106 between a number of positions, such as a non-use position and a deployed position. As one example, the drive mechanism 124 may include a linear actuator, such as a spindle drive 126, that may be fixed to the carrier plate 110 and may include a main body 128 and one or more (e.g., two) translating portions, such as a first translating portion 130 and a second translating portion 132. The first translating portion 130 may be connected to a pivot bracket 134 that may be operatively connected to the platform 120. As an example, the pivot bracket 134 may include a first arm 136, a second arm 138, and a pivot point 140 may be disposed between the first and second arms 136, 138.

A force-transmission member, such as a lever arm 144 includes a first end 144a, that may be fixed to the platform 120, and a second end 144b that may be fixed to an articulating arm 142. Each end of the articulating arm 142, such as the bottom end 142a connected to the second end 144b of the lever arm 144 and the top end 142b connected to the pivot bracket 134, may each be configured to pivot or rotate so that the articulating arm articulates as the first translating portion 130 extends and retracts with respect to the main body 128 of the spindle drive 126 (as shown, for example in FIGS. 5A-5B). In one or more embodiments, the drive mechanism 124 may be operatively coupled to another functional component, such as a latch assembly 146 that may be configured to latch or lock and release or unlock the platform 120 to and from one or more portions of the minor gate 106 such as the carrier plate 110. The latch assembly 146 may include a striker 148 and a catch 150 that may be configured to receive the striker 148 when the latch assembly 146 is in the latched or locked state (FIG. 4). Wires 154 may be connected to each striker and as the cable or wire 154 is pulled, the striker 148 may be retracted to unlock the latch assembly 146.

As an improvement over known split tailgates, the present disclosure provides a lost-motion mechanism 152 that may be connected to the latch assembly 146 by one or more linkages or wires 154 as shown. Lost-motion mechanism 152 may be operatively connected to portions of drive mechanism 124, such as the second translating portion 132. Conventionally, known split gates provided with a step are released or unlocked from the minor gate by manual movement of a cable or other linkage. Instead, the lost-motion mechanism 152 may be configured to change the state of the latch assembly 146, such as from the latched or locked state to the disengaged or unlatched state prior to or at substantially the same time as the drive mechanism 134 moves one or more of the functional components (e.g., the platform 120) from the non-use position to the deployed or use position. To release the platform 120, a translating member 158 of the lost-motion mechanism 152 may be connected to the wire 154 and actuated to move (e.g., translate) along a fixed member 156, thus pulling the wire 154 to retract the striker 148 so that the striker 148 disengages the catch 150.

As another improvement over known split tailgates or powered tailgates in general, the present disclosure provides an assembly module 160 configured for attachment to the minor gate 106. The assembly module 160 may include the carrier plate 110 which may carry the platform 120, the drive mechanism 124, latch assembly 146, and other functional components. As one example, the drive mechanism 124 may be fixed to the carrier plate 110 by a drive mounting bracket 162. The drive mounting bracket 162 may be composed of a main portion 164 and first and second end portions 166, 168 that may each extend from opposing sides of the main portion 164. As one non-limiting example, the first end portion 166 may be disposed in a central region 170 on the second side 114b of the carrier plate 110 main body 114 and the second end portion 168 may be disposed within a second end region 174 on the second side 114b of the carrier plate 110 main body 114. The main body 128 of the spindle drive 126 may be pivotally coupled or connected to one or more portions, such as the second end portion 168 of the drive mounting bracket. The pivot bracket 134 may be pivotally connected to the first end portion 166 of the drive mounting bracket 162 and the fixed member 156 of the lost-motion mechanism 152 may be fixed to the second end portion 168 of the drive mounting bracket 162.

Figure 2:
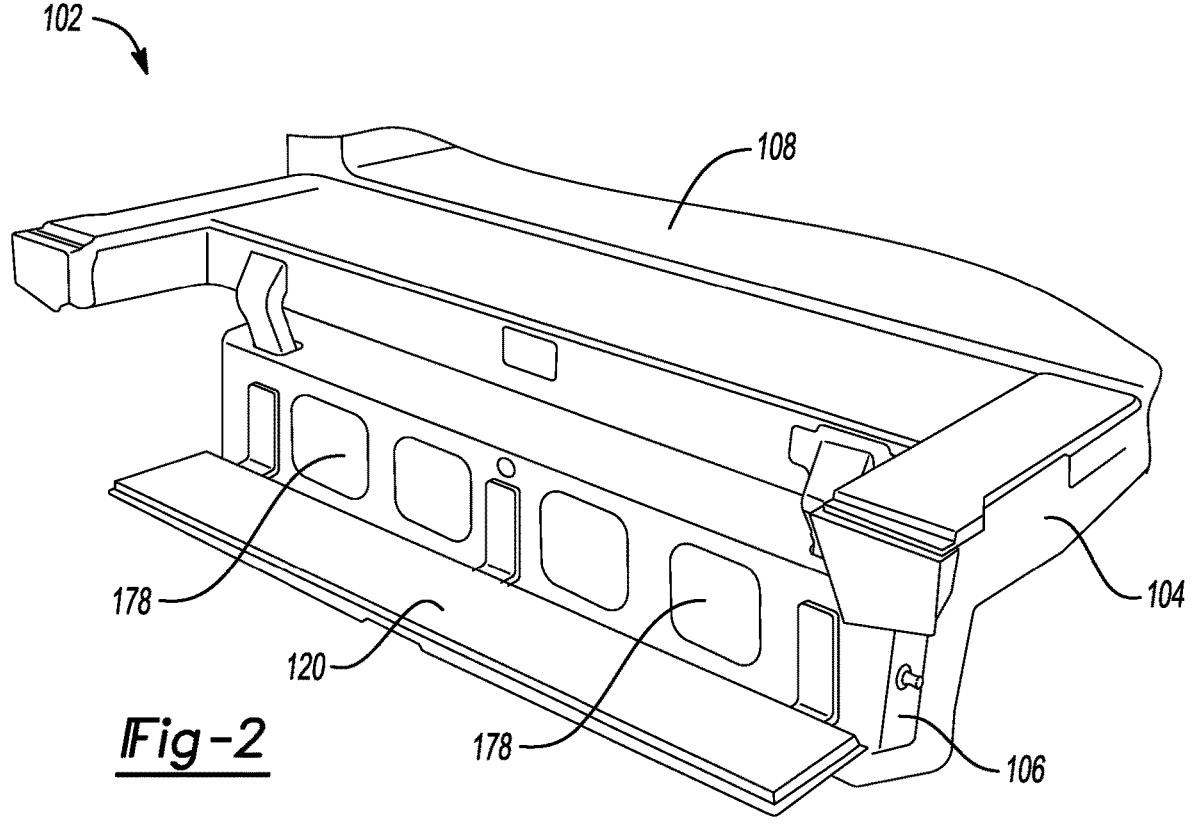
FIG. 2 illustrates a rear-perspective view of the exemplary tailgate assembly in an open position and deployed position.

FIG. 1 shows a rear view of an exemplary vehicle such as a truck 100 provided with the tailgate assembly 102 in the closed and non-use position. FIG. 2 shows a rear perspective view of the tailgate assembly 102 in the fully opened and deployed position. The tailgate assembly 102 includes the major gate 104, configured to rotate about the vehicle body (e.g., truck bed) 108, and the minor gate 106 configured to rotate about the major gate 104. As shown, in the deployed position, one or more functional components, including a step formed by platform 120 may be deployed so that a user may step up into the truck bed and so that a number of vehicle accessories, that may be disposed in accessory apertures 179 (FIG. 3), such as audio speakers 176, lights 178, or other accessories, including but not limited to power or USB connectors (not illustrated).

Figures 5, 5A:
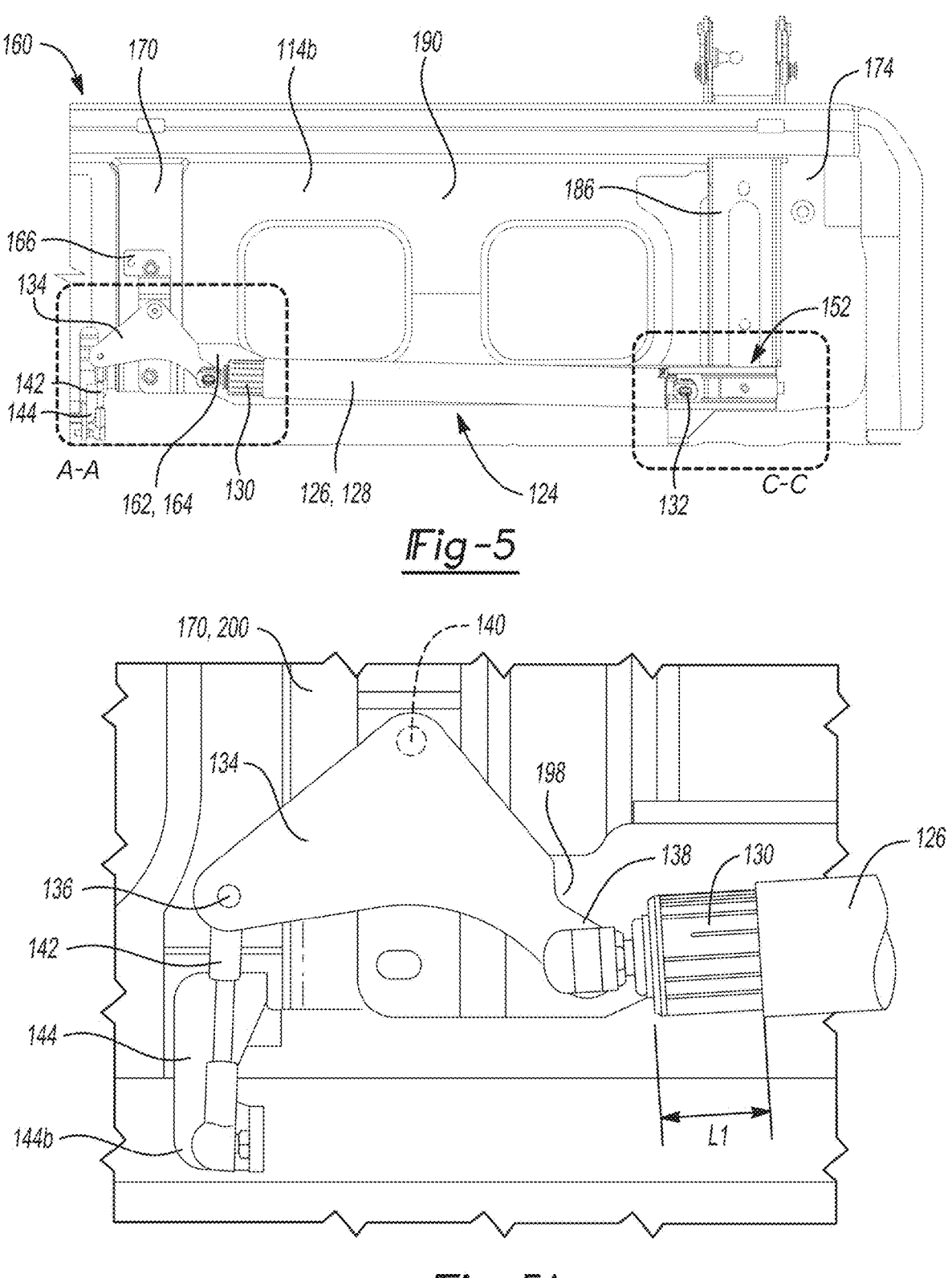
FIG. 5 illustrates a partial-rear-plan view of a portion of the exemplary tailgate assembly.
FIG. 5A illustrates a detail view of a portion of a drive mechanism disposed in the exemplary tailgate assembly taken along the lines A-A in FIG. 5 in which the tailgate assembly is in a non-use position.

FIG. 3 illustrates a rear-perspective view of the minor gate 106 provided with the assembly module 160. FIG. 5 illustrates a rear-plan view of the assembly module 160. As one non-limiting example, the carrier plate 110 may be formed by injection molding from one or more plastic materials including an organosheet. The organosheet may be formed, for example, by continuous-fiber-reinforced thermoplastic in which continuous fibers in the form of laid scrims, woven fabrics or knitted fabrics composed of glass fibers, Kevlar® fibers, carbon fibers or synthetic fibers are embedded in a thermoplastic matrix. A suitable thermoplastic for the matrix is for example polyamide or polypropylene. The expression "continuous-fiber-reinforced" is to be understood to mean that the length of the fibers used for reinforcement is limited substantially by the size of the plate-like organosheet. The organosheet may be disposed in places within the carrier plate 110 that require additional stiffness or added strength, including (but not limited to) the first and second end regions 172, 174 of the main body 114 as well as an upper edge region 188 of a peripheral panel 184 extending from the main body 114 of the carrier plate.

Minor gate 106 may be pivotally or rotationally connected to the major gate 104 by one or more minor gate hinges 180 that may extend through apertures 182 and into a cavity 190. The apertures 182 may be formed by the peripheral panel 184 extending from the main body 114 of the carrier plate 110. As shown, attachment portions 186 of the minor gate hinge 180 may be fixed to the second side of the carrier plate 110, for example, in the first and second end regions 170, 172. Minor gate hinges 106 may be attached or fixed to the carrier plate prior to reach the OEM thus reducing cycle time for the OEM or integrator of the minor gate 106 to the major gate 106. In one or more embodiments, the tailgate step hinges 118 of the tailgate step assembly 116 may each be disposed on the first side 114a of the carrier plate 110 and located within the first and second end regions 172, 174 of the same so that the tailgate step hinges 118 are supported by the reinforced plastic material described above. As another example, the tailgate step hinges 118 may be integrally molded with the carrier plate 110, thus further increasing efficiency by eliminating separate components and associated assembly time.

FIG. 4 illustrates a rear-perspective view of the assembly module 160 attached to the minor gate outer panel 112. As illustrated the platform 120 is in the closed or non-use position and the latch assembly 146 is in the locked state. The striker 148 of the latch assembly 146 may be biased by one or more springs (not illustrated) so that when the platform 120 is in the non-use position, the striker 148 is received by the catch 150. The carrier plate 110 may form a semi-enclosed space bounded by the main body 114, the peripheral panel 184, and a bottom peripheral panel 192.

Alternatively or additionally, the carrier plate 110, the outer panel 112, or both may include one or more seals or gaskets (not illustrated) to provide a water-tight or water resistant seal between the carrier plate 110 and the outer panel 112. Alternatively or additionally, the bottom peripheral panel 192 may define one or more apertures 194 configured to drain liquid (e.g., water) from the cavity 190 and outside of the minor gate 106.

Figure 5B:
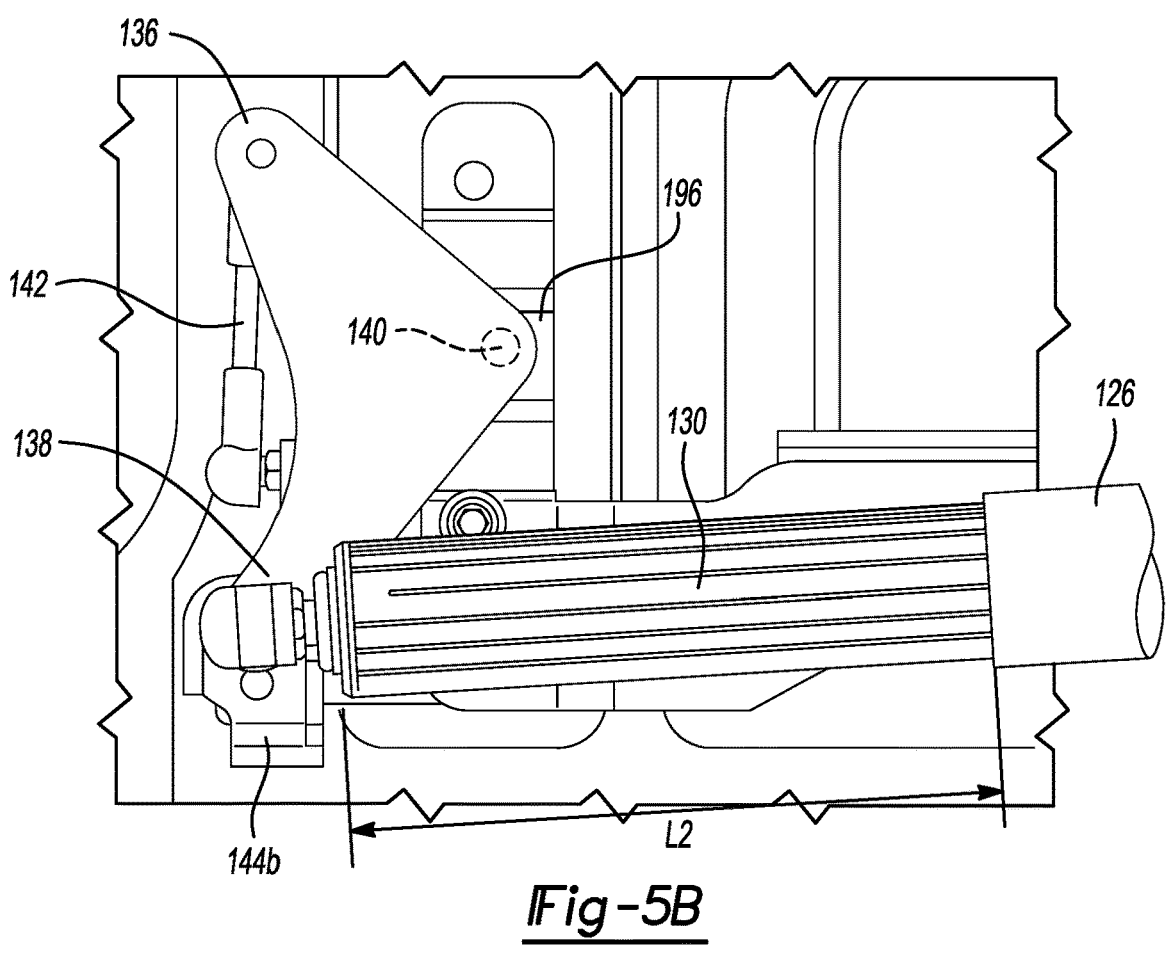
FIG. 5B illustrates a detail view of a portion of a drive mechanism disposed in the exemplary tailgate assembly in which the exemplary tailgate assembly is disposed in a deployed or use position.

As described above, FIG. 5 illustrates a rear-plan view of a portion of the assembly module 160. FIG. 5A and FIG. 5B illustrate a portion of the drive mechanism 124 such as the pivot bracket 134, articulating arm 142, and force-transmission member 144 in a first position, in which the tailgate step or platform 120 is in the non-use position, and in a second position, in which the tailgate or step 120 is in the use or deployed position. When the platform is in the non-use position, the first translating portion 130 may extend from the main body 128 of the spindle drive by a first distance or length L1 and as spindle drive 126 actuates the first translating portion 130 may extend towards the force-transmission member 144 so that the first translating portion 130 is spaced apart from the main body 128 by a second distance L2. In response to movement (e.g., extension) of the first translating portion 130, the pivot bracket 134 rotates (e.g., in the clock-wise direction when viewing FIGS. 5A-5B). Rotation of the pivot bracket 134 may pull or move the articulating arm 142 upwards and towards the pivot bracket 134 and the second end 144b of the force-transmission member or lever arm 144 moves upwards to move the first end 144a of the lever arm 144 downwards to lower or deploy the platform 120.

The first end portion 166 of the drive mounting bracket 162 may have a substantially planar shape and one or more intermediate parts (e.g., washers, shim) may be disposed between the pivot bracket 134 and the first end portion 166 of the bracket 162. Alternatively and as shown, the first end portion 166 may include a raised portion 196 that may be spaced apart from the second surface of the carrier plate 110 to accommodate attachment of the spindle drive 126 to the platform 120. The first end portion 166 may be fixed to a central reinforcement bracket 200 which may provide additional stiffness in the central region 170 of the carrier plate 110. As previously stated above, the central region 170 may have a wall thickness that is greater than other portions of the carrier plate 110. Alternatively or additionally, the central reinforcement bracket 200 may be overmolded or replaced by continuous fiber reinforcement. In one or more embodiments, the pivot bracket 134 may include one or more notches 198 so that the first translating portion 130 may extend and pivot the pivot bracket 134 without interference or a collision between the first translating portion 130 and the pivot bracket 134.

Figure 5C:
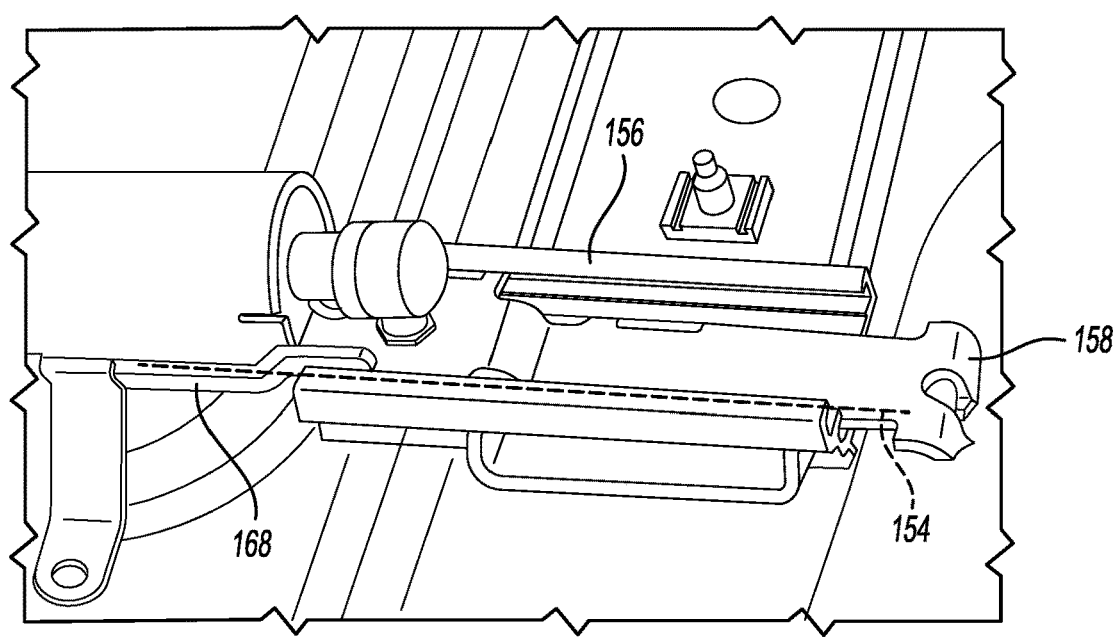
FIG. 5C illustrates a detail view of a lost-motion mechanism in a first position and disposed in the exemplary tailgate assembly taken along the lines C-C in FIG. 5.
Figure 5D:
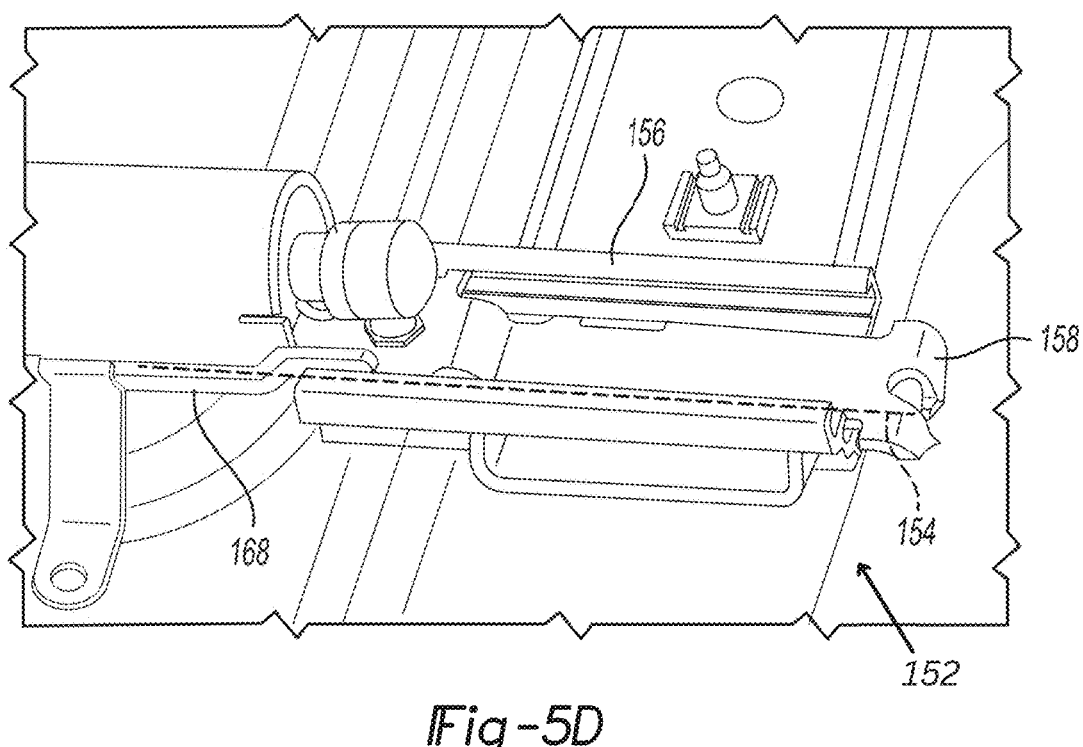
FIG. 5D illustrates a detail view of a lost-motion mechanism in a second position and disposed in the exemplary tailgate assembly.

FIG. 5C and FIG. 5D show the lost-motion mechanism 152 in a first position and a second position, respectively. As the in which the latch assembly 146 (FIG. 4) is in the unlatched state, and a second position in which the latch assembly 146 (FIG. 4) is in the unlocked or disengaged state. In one or more embodiments, the translating member 158 may be fixed to the cable or wire 154 (as represented by the dashed lines) routed beneath the translating member or the fixed member 156 and connected to the one or more strikers 148. The second translating portion 132 (FIG. 5) may retract towards the main body 128 (FIG. 5) to move the translating member 158 thus pulling the wire 154 and releasing the latch assembly 146 (FIG. 4).

Figure 6:
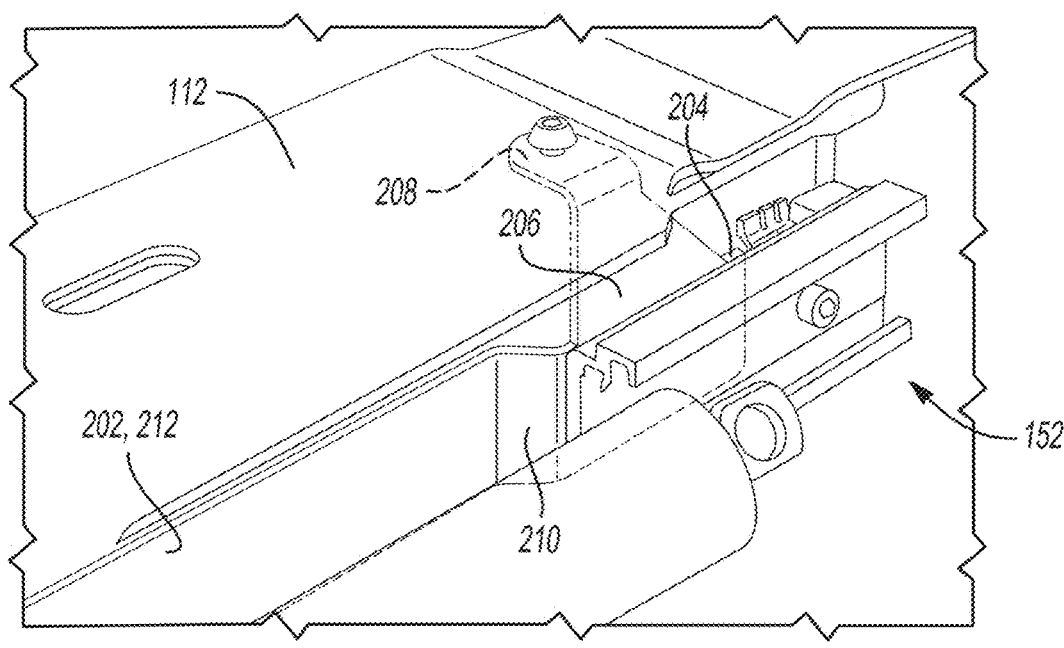
FIG. 6 illustrates a perspective view of a portion of the drive mechanism and lost-motion mechanism according to another embodiment.

FIG. 6 shows a portion of a drive mounting bracket 202 according to at least one other embodiment. The drive mounting bracket 202 includes a main portion 212 and a second end portion configured for attachment to the outer panel 112 and for supporting the lost-motion mechanism 152. As an example, the second end portion 204 of the drive mounting bracket 202 may include an angled portion 210 extending from the main portion 212 so that the second end portion 204 is spaced apart from portions of the outer panel 112. The second end portion 204 may include an angled flange 206 and a mounting flange 208 that may extend from the angled flange 206. The mounting flange 208 may be fixed to the outer panel 112 by one or more fasteners or another attachment feature, as required.

Figure 7A:
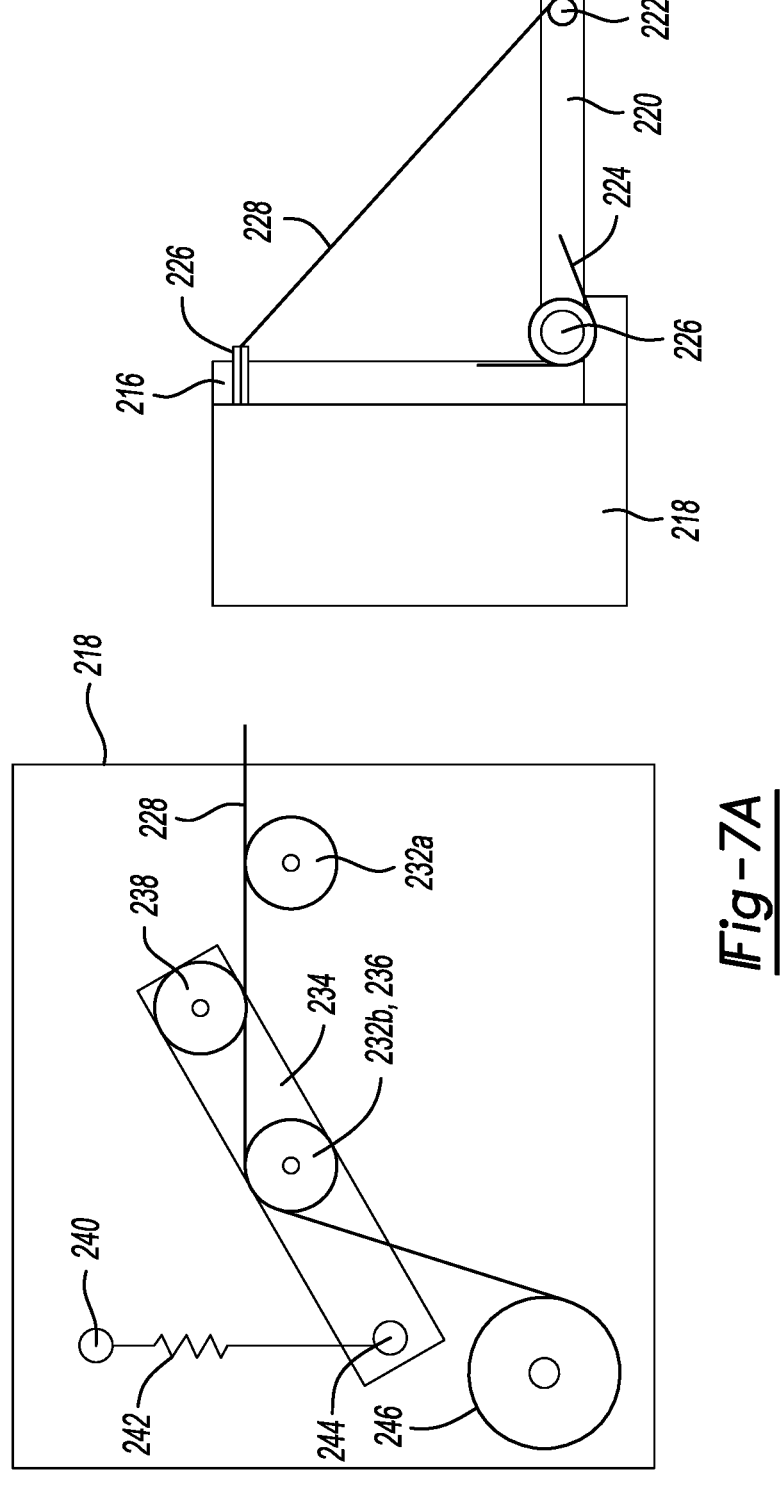
FIGS. 7A-7C illustrate schematic views of a tailgate assembly in an open state, semi-closed state, and a closed state, according to another embodiment.
Figure 7B:
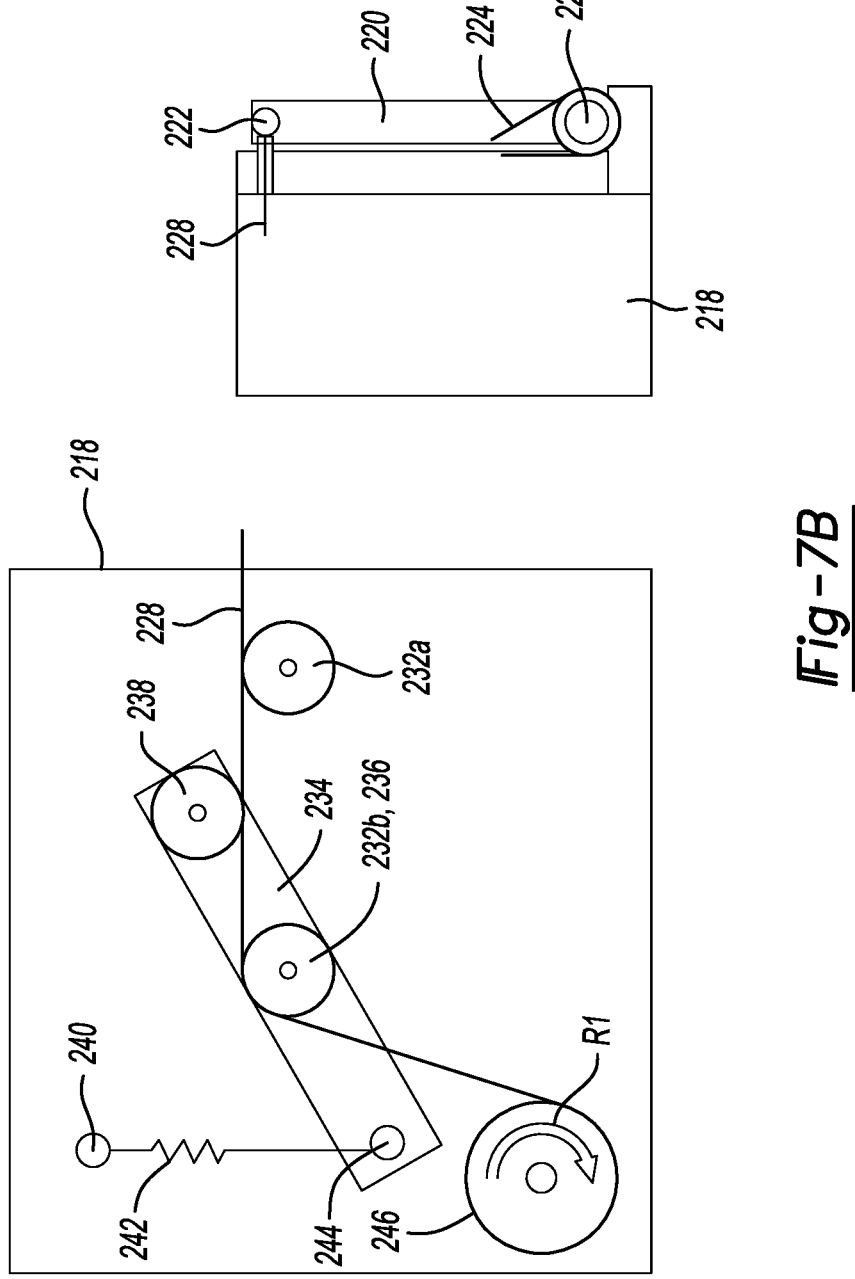
Figure 7C:
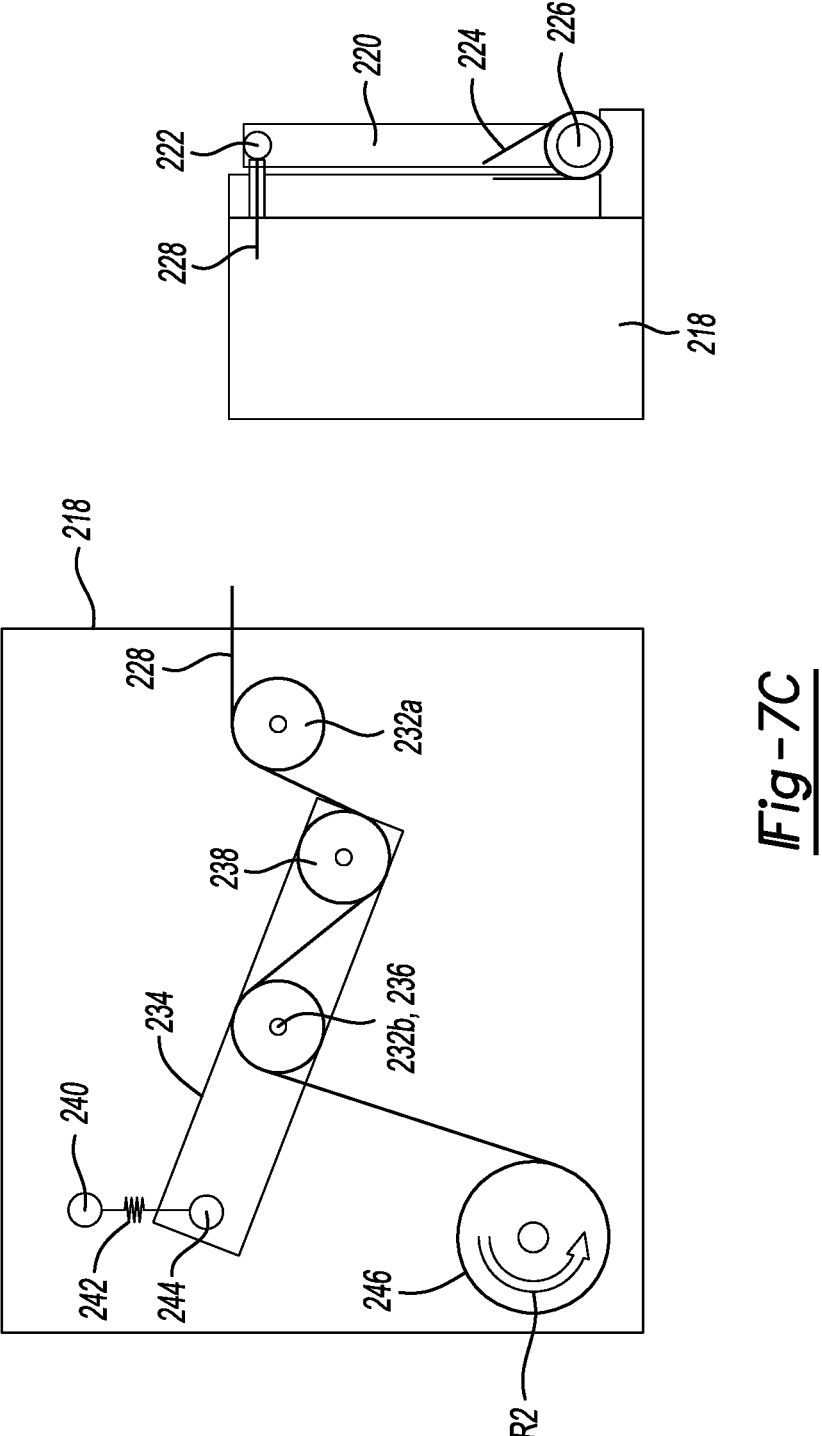

FIGS. 7A-7C each illustrate a schematic view of a portion of a tailgate assembly 214 according to one or more embodiments. In particular, FIG. 7A illustrates a schematic view of the tailgate assembly provided with a minor gate 216 and a deployable member, such as a step 220 and cable 228 connected thereto in an open position, FIG. 7B shows the step 220 and cable 228 in a first closed position, and FIG. 7C shows the step 220 and cable 228 in a second closed position.

The minor gate 216 includes the step 220 pivotally coupled to the minor gate 216 so that the step 220 may rotate about a rotational axis 226 between the open position (FIG. 7A) and the closed position (FIGS. 7B-7C). The tailgate assembly 214 include the minor gate 216 forming a cavity 218 and an actuation mechanism, including the cable 228 extending between the step 220 and a cable drum 246. The cable drum 246 may include a motor 248 (FIG. 8) configured to rotate the cable drum 246 to increase or decrease the amount of cable 216 (e.g., increase or decrease slack) extending between the step 220 and the cable drum 246 in order to move the step 220 between the open and closed positions.

The cable 216 may be routed through one or more cable support rollers 232 such as a first cable support roller 232a, that may be mounted to one or more panels of the minor gate 216, and a second cable support roller 232b. The second cable support roller 232b may fixed to cable tensioner 234 that is configured to pivot about pivot point 236 to adjust the tension in the cable 228. It should be understood that the cable tensioner 234

One or more springs 224 may be operatively connected to the step 220 and the minor gate 216. When the step 220 is in the closed position and is released e.g., by unlocking the latch (not illustrated) the spring 224 biases and rotates the step 220 about the rotational axis 226 towards the open position. As the step 220 is lowered or rotated, the cable support rollers 232a, 232b and cable tensioner 234 collectively apply tension to the cable 228 so that cable 228 is fed out of the minor gate cavity 218 at a substantially consistent rate.

To move the step 220 from the open position to the closed position, the cable drum 246 rotates in a first rotational direction R1 and winds up portions of the cable 216. In one or more embodiments, the cable drum 246 may be self-locking and not capable of being back driven. The cable drum 246 may be rotated in a second rotational direction R2, when the step 220 is in the closed position, so that the cable 216 is unwound from the cable drum 246 and manual movement of the step 220 is enabled. The tensioner 234 may be rotated to apply tension to the cable 216 so that the cable 216 holds the step 220 in the closed position. The cable tensioner 234 may be biased by a spring 242 that is connected to the cable tensioner 234 at attachment portion 244 and a distal end connection point 240 that may be fixed within the cavity 218.

Figure 8:
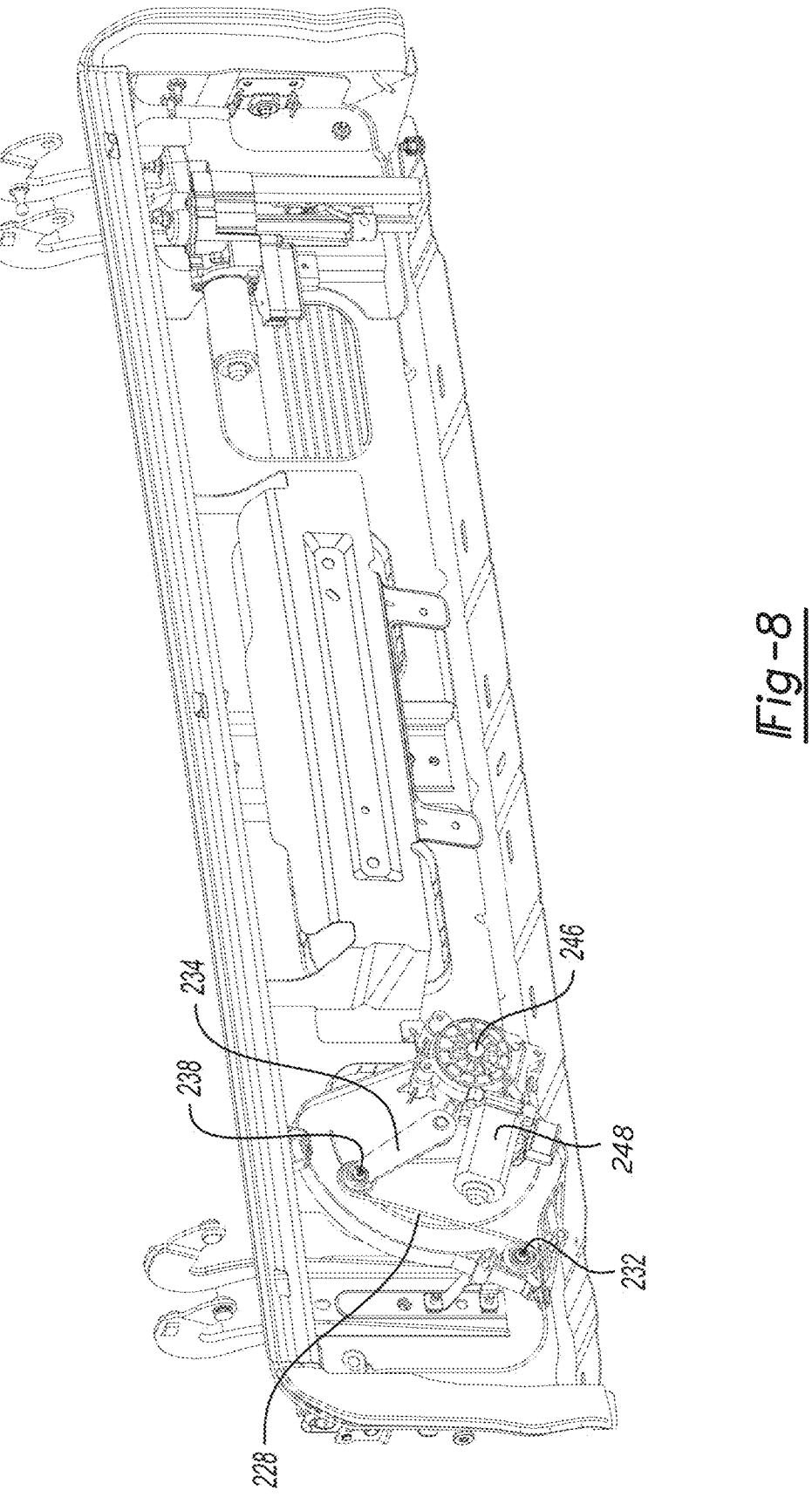
FIG. 8 illustrates a perspective view of an exemplary tailgate assembly according to another embodiment.

FIG. 8 illustrates an minor tailgate assembly 250 provided with an actuation mechanism including the cable drum 246, motor 248, cable 228, cable tensioner 234, and cable support roller 232. For purposes of clarity, the tailgate step and associated hinges are not illustrated. The operation of the actuation mechanism may be substantially similar to what was described with reference to FIGS. 7A-7C.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

100 truck
102 tailgate assembly
104 major gate
106 minor gate
108 vehicle body
110 carrier plate
112 outer panel
114 main body
114*a* first side
114*b* second side
116 tailgate step assembly
118 tailgate step hinges
120 platform
122 flanges
124 drive mechanism
126 spindle drive
128 main body
130 first translating portion
132 second translating portion
134 pivot bracket
136 first arm
138 second arm
140 pivot point
142 articulating arm
144 force-transmission member, lever arm

144*a* first end, lever arm
144*b* second end, lever arm
146 latch assembly
148 striker
150 catch
152 lost-motion mechanism
154 cable or wire
156 fixed member
158 translating member
160 assembly module
162 drive mounting bracket
164 main portion
166 first end portion
168 second end portion
170 central region of carrier plate
172 first end region of carrier plate
174 second end region of carrier plate
176 audio speakers
178 lights
179 accessory apertures
180 minor gate hinges
182 apertures for minor gate hinge
184 peripheral panel
186 attachment portion minor gate hinge
188 upper edge region of peripheral panel
190 cavity
192 bottom peripheral panel
194 apertures in bottom peripheral panel
196 raised portion of first end portion of drive bracket
198 notch in pivot bracket
200 central reinforcement bracket
202 drive mounting bracket
204 second end portion drive mounting bracket
206 angled flange
208 mounting flange
210 angled portion
212 main portion
214 tailgate assembly
216 minor gate
218 cavity minor gate
220 step
222 cable attachment step
224 spring for step
226 rotational axis
228 cable
230 conduit
232 cable support rollers
234 cable tensioner
236 pivot point of cable tensioner
238 cable tensioner roller
240 spring mount
242 tensioner spring
244 tensioner spring distal end
246 cable drum
248 motor
250 minor gate assembly

What is claimed is:

1. A tailgate assembly comprising:
a first gate configured to rotate with respect to a vehicle body; and
a second gate configured to rotate with respect to the first gate, the second gate including:
an outer panel,
an injection-molded carrier plate configured to be fixed to the outer panel to form a cavity, the injection-molded carrier plate configured to carry a number of functional components, and a drive mechanism fixed to the carrier plate and operably connected to at least one functional component of the number of functional components, the drive mechanism configured to actuate and move the at least one functional component with respect to the second gate between a number of positions.

2. The tailgate assembly of claim 1, wherein the number of functional components includes a deployable member coupled to and configured to move with respect to the second gate between a non-use position and a deployed position of the number of positions.

3. The tailgate assembly of claim 2, wherein the deployable member includes a platform configured to form a step to support a user.

4. The tailgate assembly of claim 3, wherein the injection-molded carrier plate includes a main body, the main body including a first end region, a second end region, and a central region, the central region disposed between the first and second end regions, wherein at least one of the first end region, the second end region, and the central region has a first wall thickness and other regions of the main body has a second wall thickness, the second wall thickness different than the first wall thickness.

5. The tailgate assembly of claim 4, wherein the second wall thickness is less than the first wall thickness.

6. The tailgate assembly of claim 5, further comprising: a number of hinges fixed to a first side of the injection-molded carrier plate, a first hinge of the number of hinges disposed within the first end region of the main body, a second hinge of the number of hinges disposed within the first end region of the main body, the number of hinges configured to be connected to either the first gate or the deployable member.

7. The tailgate assembly of claim 1, further comprising: a drive mounting bracket configured to carry the drive mechanism and including a main portion, a first end portion, and a second end portion, the first and second end portions each extending from the main portion, the injection-molded carrier plate including a main body, the main body including a first end region, a second end region, and a central region, the central region disposed between the first and second end regions, wherein at least one of the first end region, the second end region, and the central region has a first wall thickness and other regions of the main body has a second wall thickness, the second wall thickness different than the first wall thickness, and wherein the first end portion is fixed to the central region of the injection-molded carrier plate.

8. The tailgate assembly of claim 7, wherein the injection-molded carrier plate includes a number of accessory apertures each configured to receive a vehicle accessory, and the drive mounting bracket extends over and covers at least some of the number of accessory apertures.

9. The tailgate assembly of claim 8, wherein the number of functional components includes a latch assembly and a platform, the platform coupled to and configured to move with respect to the second gate between a non-use position and a deployed position of the number of positions, the latch assembly provided with, a latch including at least one striker and at least one catch, the at least one striker fixed to one of the injection-molded carrier plate and the platform and the catch fixed to the other of the carrier plate and the platform, the latch operable between a locked state, in which the striker engages the catch, and an unlocked state in which the striker is disengaged from the catch, and a lost-motion mechanism operably connected to the latch and the drive mechanism so that as the drive mechanism actuates in the first direction, the lost-motion mechanism is actuated to change the state of the latch from the locked state to the unlocked state prior to moving the platform from the non-use position towards the deployed position.

10. The tailgate assembly of claim 9, wherein the lost-motion mechanism includes a fixed member and a translating member, the fixed member and the second end region of the injection-molded carrier plate sandwiching at least a portion of the second end portion of the drive mounting bracket.

11. An assembly module configured for use in a tailgate assembly provided with a major gate and a minor gate, the major gate configured to rotate with respect to a vehicle body and the minor gate configured to rotate with respect the major gate, the assembly module comprising: a carrier plate configured to be fixed to an outer panel of the minor gate, the carrier plate including a main body having a first surface and a second surface, the first surface opposing the second surface; a deployable member pivotally coupled to the first surface of the carrier plate configured to rotate with respect to the carrier plate between a deployed position and a non-use position; a linear actuator fixed to the second surface of the carrier plate; a force-transmission member including a first end and a second end, the first end fixed to the deployable member; and a pivot bracket pivotally coupled to the second surface of the carrier plate and including a first leg and a second leg, the first leg connected to the force-transmission member and the second leg connected to the linear actuator.

12. The assembly module of claim 11, further comprising: a number of minor gate hinges fixed to the carrier plate, each minor gate hinge of the number of minor gate hinges including an attachment portion and a hinge portion, the attachment portion fixed to the second surface of the carrier plate and the hinge portion configured to be connected to the major gate, the force-transmission member substantially equidistantly spaced apart from a first minor gate hinge of the number of minor gate hinges and a second minor gate hinge of the number of minor gate hinges.

13. The assembly module of claim 11, further comprising: a latch including a striker and a catch, the striker fixed to one of the carrier plate and the deployable member and the catch fixed to the other of the carrier plate and the deployable member, the latch operable between a locked state, in which the striker engages the catch, and an unlocked state in which the striker is disengaged from the catch, wherein the latch is operatively connected to the linear actuator so that in response to actuation of the linear actuator, the latch changes from the locked state to the unlocked state.

14. The assembly module of claim 13, further comprising: a lost-motion mechanism disposed in a cavity formed by the carrier plate and the outer panel of the minor gate, the lost-motion mechanism operably connected to the latch and the linear actuator so that as the linear actuator actuates in the first direction, the linear actuator actuates the lost-motion mechanism to change the state of the latch from the locked state to the unlocked state substantially prior to moving the deployable member from the non-use position towards the deployed position.

15. The assembly module of claim 14, wherein the lost-motion mechanism includes a fixed member and a translating member, the fixed member fixed to the second surface of the carrier plate, the translating member coupled to the linear actuator and configured to move along the fixed member in response to actuation of the linear actuator.

16. The assembly module of claim 15, wherein the deployable member is configured to rotate about a rotational axis, and the translating member of the lost-motion mechanism is configured to move in a direction substantially parallel to the rotational axis.

17. The assembly module of claim 11, further comprising:
   an actuator mounting bracket including a main body, a first end portion, and a second end portion, the first and second end portions respectively extending from first and second end regions of the main body, a section of the first end portion sandwiched between the second surface of the carrier plate and at least a portion of the pivot bracket.

18. The assembly module of claim 17, wherein the carrier plate includes a first peripheral panel extending from the main body in a direction substantially transverse to the main body of the carrier plate, the second end portion including a flange fixed to the first peripheral panel.

19. A method of assembling a minor gate for use in a tailgate assembly, the tailgate assembly provided with a major gate and the minor gate, the major gate configured to rotate with respect to a vehicle body and the minor gate configured to rotate with respect to the major gate, the method comprising:
   forming a carrier plate configured to be fixed to an outer panel of the minor gate, the carrier plate including a main body having a first side and a second side, the first side opposing the second side;

attaching at least one minor gate hinge to a first side of the carrier plate, the at least one minor gate hinge configured to be rotationally connected to the major gate;

attaching at least one tailgate step assembly to the second side of the carrier plate, the tailgate step assembly including a tailgate step hinge and a platform configured to rotate with respect to the tailgate step hinge;

inserting at least one vehicle accessory into one of a number of vehicle accessory apertures;

attaching at least one drive mounting bracket to the first side of the carrier plate so that at least a portion of the drive mounting bracket covers the at least one vehicle accessory;

attaching a pivot bracket to the at least one drive mounting bracket, the pivot bracket configured to pivot with respect to the at least one drive mounting bracket;

attaching a spindle drive assembly to the drive mounting bracket and the pivot bracket; and operatively coupling the pivot bracket to the tailgate step assembly so that in response to actuation of the spindle drive assembly, the platform of the tailgate step assembly rotates about the tailgate step hinge.

20. The method of claim 19, further comprising:
placing the at least one minor gate hinge in an end region of the carrier plate, wherein the forming step includes injection molding the carrier plate, the carrier plate including the end region the end region having a first wall thickness and other regions of the carrier plate having a second wall thickness, the second wall thickness less than the first wall thickness.

* * * * *